United States Patent [19]

Talbert

[11] 4,038,180

[45] July 26, 1977

[54] PROCESS OF DEWATERING SEWAGE SLUDGE

[75] Inventor: Norwood K. Talbert, Manlius, N.Y.

[73] Assignee: Agway, Inc., Syracuse, N.Y.

[21] Appl. No.: 647,739

[22] Filed: Jan. 9, 1976

Related U.S. Application Data

[63] Continuation-in-part of Ser. No. 526,134, Nov. 22, 1974, abandoned.

[51] Int. Cl.² .............................................. C02C 3/00
[52] U.S. Cl. ...................................... 210/10; 210/51; 210/68; 71/12
[58] Field of Search ............. 71/11, 12, 37, 43, 64 JC; 210/10, 48, 51, 63 R, 68

[56] References Cited

U.S. PATENT DOCUMENTS

| | | | |
|---|---|---|---|
| 3,050,383 | 8/1962 | Wilson ................................. | 71/12 X |
| 3,527,592 | 9/1970 | McPherson et al. ................ | 71/43 X |
| 3,676,100 | 7/1972 | Gerhardt et al. ........................ | 71/37 |
| 3,758,287 | 9/1973 | Scheel ..................................... | 71/12 |
| 3,772,191 | 11/1973 | Thorn ............................... | 210/10 X |

OTHER PUBLICATIONS

JIEC, vol. 13, No. 5, May 1921, pp. 406–410, Wilson et al.

Primary Examiner—Frank A. Spear, Jr.
Assistant Examiner—Ferris H. Lander
Attorney, Agent, or Firm—Charles S. McGuire

[57] ABSTRACT

Sludge from a municipal or industrial sewage treatment facility is mixed with a mineral acid or anhydride thereof to release the entrapped water in the sludge. The resulting mixture of sludge solids and diluted acid or anhydride is then mixed with a basic material, such as ammonia, the heat generated by reaction of the base and acid evaporates the water to form either a completely dry mixture of sludge solids and a salt, or a mixture having a predetermined moisture content which may be air dried. In some applications it is preferable to recycle a portion of the end product by adding it to the reaction vessel.

10 Claims, 5 Drawing Figures

PROCESS OF DEWATERING SEWAGE SLUDGE

RELATED PRIOR APPLICATION

This is a continuation-in-part of U.S. application Ser. No. 526,134 of the same inventor, filed Nov. 22, 1974, and now abandoned.

BACKGROUND OF THE INVENTION

The present invention relates to sewage sludge disposal and, more specifically, to novel methods of dewatering and forming useful products from sludge produced by typical industrial or municipal sewage treatment systems.

Disposal of sewage sludges presents problems both of environmental pollution and of energy consumption. Although transporting sludges by barge several miles off coast and dumping it in the ocean is practised in many coastal areas, the resulting pollution is recognized as a serious environmental problem which cannot continue indefinitely without disastrous consequences. Likewise, land disposal by spreading wet sludges over unoccupied areas creates pathogenic and bacteriological risks, as well as esthetic problems. In any case, transportation and handling of the sludges, which may contain 90% or more of water, is expensive and energy consuming. In spite of the economic and ecological objections to water and land disposal of the sludges, they are considered preferable to drying or burning the sludge by heat from burning fuels due to the enormous quantity of energy required to evaporate the entrapped water.

Recent methods of treating sludge to reduce the disposal problems include acid treatment systems such as that disclosed in U.S. Pat. No. 3,772,191, wherein the sludge is acidified with a mineral acid and allowed to separate by gravity into an upper layer of hydrophobic substances, an intermediate layer of supernatant liquid, and a lower layer of sludge substances of lower water content than the original sludge. The upper and intermediate layers are drained off and the precipitated sludge substances, still containing 80% water, are treated with calcium hydroxide to facilitate further dehydration through pressure filtration in a filter press. The product mixture removed from the filter press has a water content of 30% to 50%, which is still 50–65% water based on contained sludge in the total mixture.

Although the above described process constitutes a material improvement over conventional disposal methods through improved pressure filtration rates of sludge solids, there are still a number of obvious problems. The surface layer, consisting of lipides, fatty acids, higher hydrocarbons and the like, must be disposed of, as must the intermediate layer of diluted acid. Also, the final product, consisting of sludge solids and lime, still may contain up to 50% water. Since the acidified sludge must be allowed to settle for several hours or days, the process is not suitable for continuous operation, with new materials constantly being added to mixing or reacting vessels.

It is a principal object of the present invention to provide a method for dewatering sewage sludge in a rapid, efficient, economical manner, essentially obviating all environmental and energy problems commonly associated with sludge disposal.

A further object is to provide a method of treating sewage sludge to obtain a dry end product having useful properties as a soil fertilizer, with no intermediate or by-products which create pollution or other environmental problems in their disposal.

Other objects are to provide a sludge treatment process which may be carried out with the apparatus of conventional fertilizer granulation plants without substantial modification; to provide a method of dewatering sewage sludge which may be practised in the manner of a continuous chemical process; to provide a method of dewatering sewage sludge which utilizes materials other than the sludge which presently constitute atmospheric pollutants; and, to provide a process for treatment of sewage sludge to yield a dry mixture of sludge solids and fertilizer salts wherein heat provided by a chemical reaction serves to sterilize the product.

Other objects will in part be obvious and will in part appear hereinafter.

SUMMARY OF THE INVENTION

In accordance with the foregoing objects, the invention may be practised in the setting of a typical fertilizer granulation plant. The sludge and mineral acid, or an anhydride thereof, are added simultaneously to an agitated preneutralizer initially containing a quantity of the acid or anhydride suitably diluted.

In a preferred embodiment oxides of sulphur are mixed with the sludge, thus providing an essential constituent of the process while at the same time disposing of compounds which could otherwise become atmospheric pollutants.

The acid or anhydride serves to free the entrapped water from the sludge molecules and an essentially homogeneous mixture of the sludge solids in the water-diluted acid is formed. The mixture from the pre-neutralizer is added, together with a quantity of a basic chemical, preferably ammonia, to a conventional rotary granulator. The heat from the reaction of the acid (or anhydride) and base is sufficient to evaporate all or some desired portion of the water initially contained by the sludge. Although it is frequently desirable that the product removed from the granulator have some moisture content, conventional dryers and/or coolers may be utilized to produce a completely dry end product. In most applications of the invention, efficiency and performance may be enhanced by recycling a portion of the end product through the granulator.

Other refinements of the invention include using hot air from a condenser for drying the product removed from the granulator, the condenser being used in conjunction with the pre-neutralizer in conventional fashion. Also, the hot, humid air emerging from the dryer may be utilized in the granulator, and hydrogen sulfide derived from the mixture in the pre-neutralizer may be mixed with the ammonia prior to adding the latter to the granulator.

DETAILED DESCRIPTION

Figure 1:
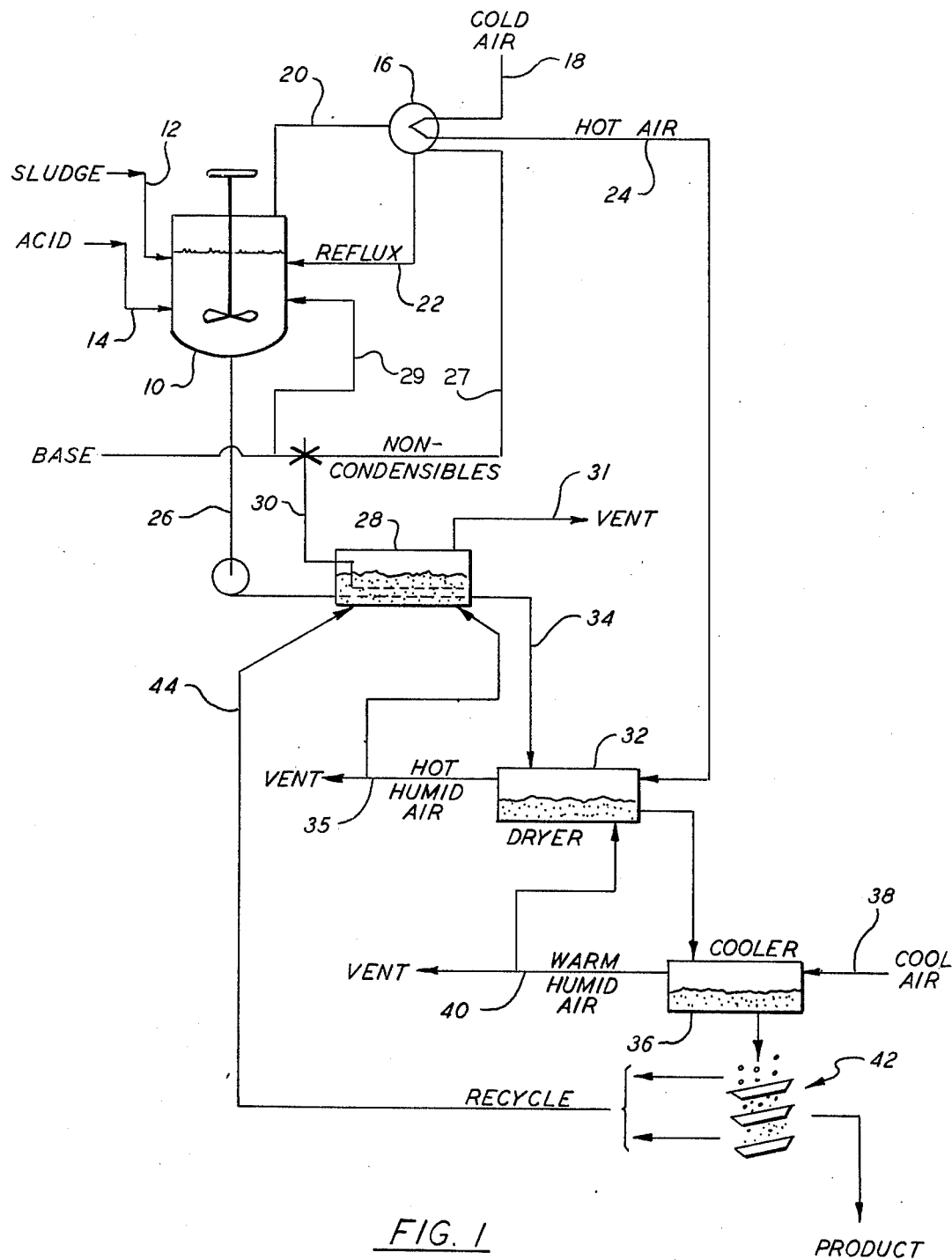
FIG. 1 is a process diagram of a typical application of the invention.

Referring now to the drawings, the reference numeral 10 denotes a mixing vessel such as a conventional agitated pre-neutralizer of a typical fertilizer plant. Sewage sludge is added at a controlled rate, determined in accordance with considerations discussed later herein, to mixing vessel 10 through inlet line 12. A mineral acid or anhydride thereof is added through inlet line 14 for mixing with the sludge. In processes utilizing an anhydride, the water contained in the sludge will immediately combine with the anhydride to form the acid, whereby a mixture of sludge and diluted acid results in either case. A conventional heat exchanger 16 receives cold air or atmospheric air at ambient temperature through line 18, which condenses the volatile substances which are boiled off by the heat generated by mixing the sludge with the acid or anhydride. The vapor from vessel 10 is supplied through line 20 and condensate is returned to vessel 10 through line 22. Heated air leaves heat exchanger 16 through line 24.

The mixture of sludge and acid/anhydride is fed from vessel 10 through line 26 to a reaction vessel 28 preferably in the form of a typical fertilizer plant rotary granulator. A controlled quantity of a basic chemical, such as ammonia, is added to reaction vessel 28 through line 30 simultaneously with the mixture of sludge and acid. Line 27 is provided to allow selective addition of any non-condensible substances from heat exchanger 16 to vessel 28, as desired. Also, selected quantities of the basic chemical may be added to the materials in vessel 10 through line 29, in cases where it may be desirable to pre-neutralize the acid to some extent before the materials are added to vessel 28. It will be understood that suitable valves are provided at appropriate locations in any or all of the inlet or outlet lines. The acidic and basic materials react in vessel 28 to form a salt and water, the heat or reaction serving to evaporate all or some of the water initially contained in the sludge as well as that produced in the reaction. The heat of the reaction also serves to effectively sterilize the materials in vessel 28, thus eliminating or minimizing any problems from pathogenic substances which may be present in the sludge. In accordance with the usual practise in commercial fertilizer production, the moisture content may be controlled to provide a desired degree of plasticity of the product as it emerges from reaction vessel 28. The water vapor is exhausted through vent 31.

The product passes from vessel 28 to a conventional dryer 32, as indicated by line 34. Relatively dry hot air is supplied to dryer 32, which may conveniently be connected to line 24 to utilize the air heated in exchanger 16. Moist hot air is exhausted from dryer 32 through line 35 and may be fully or partially returned to vessel 28, if desired. After being dried completely, or to some degree of desired low moisture content, the product may be cooled in cooler 36 to which air is supplied through line 38. The warmer air exhausted through line 40 may be fully or partially returned to dryer 32, or vented to the atmosphere.

The product emerging from cooler 36 will be a dry mixture of sludge solids and fertilizer salts. The product may then be passed through a conventional screening operation, as diagrammatically indicated at 42 for separating the granules into different size groups. A portion of the final product is taken from the screening operation for return, via line 44, to reaction vessel 28, where it is mixed with the other substances entering through lines 26 and 30, as previously described. This recycling of the final product assists in providing a desired temperature and moisture content within vessel 28 to produce the necessary consistency for granulation of the product within vessel 28.

The process is preferably carried out in a continuous manner. That is, the sludge and other raw materials are continuously added at a controlled rate and flow through the consecutive stages of the process in a continuous manner. The rate at which the materials are processed will depend upon such factors as the initial water content of the sludge, the desired percentage of sludge solids in the final product, the particular chemicals used and the desired amount of moisture to be removed by heat generated by the reacting materials. The curves shown in FIGS. 2–5 provide an indication of how the various process parameters may be relatively controlled.

Figure 2:
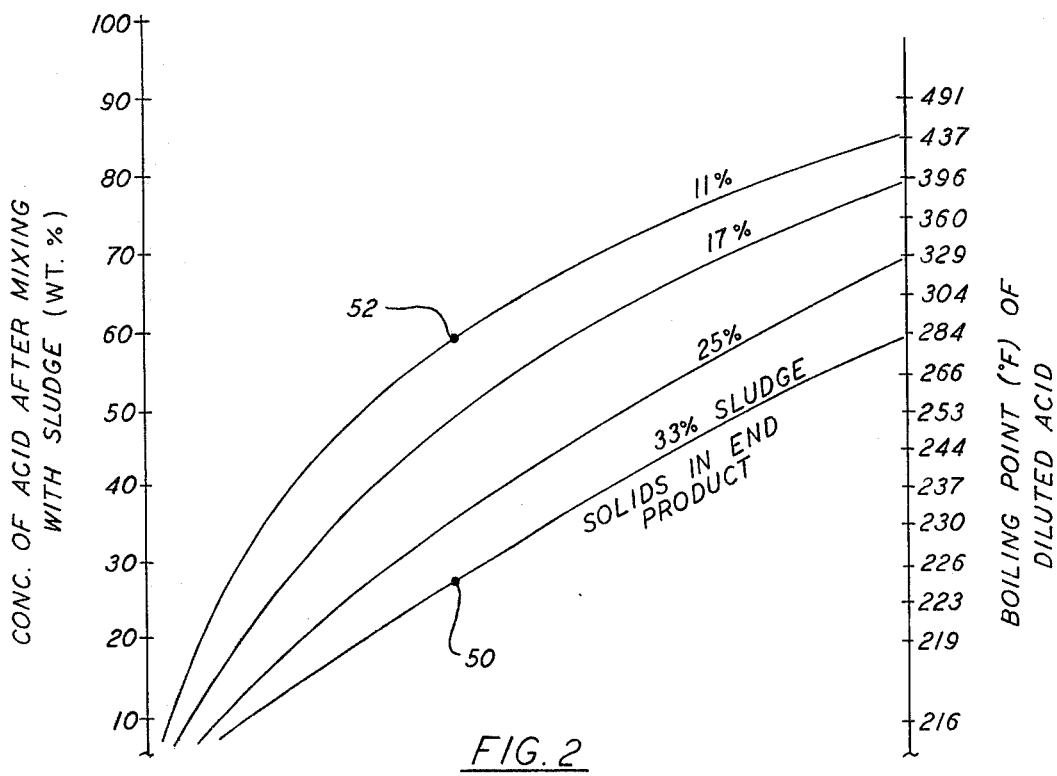
FIGS. 2 and 3 are a set of curves illustrating certain relationships in the practise of the invention when employing 100% sulfuric acid and ammonia.
Figure 3:
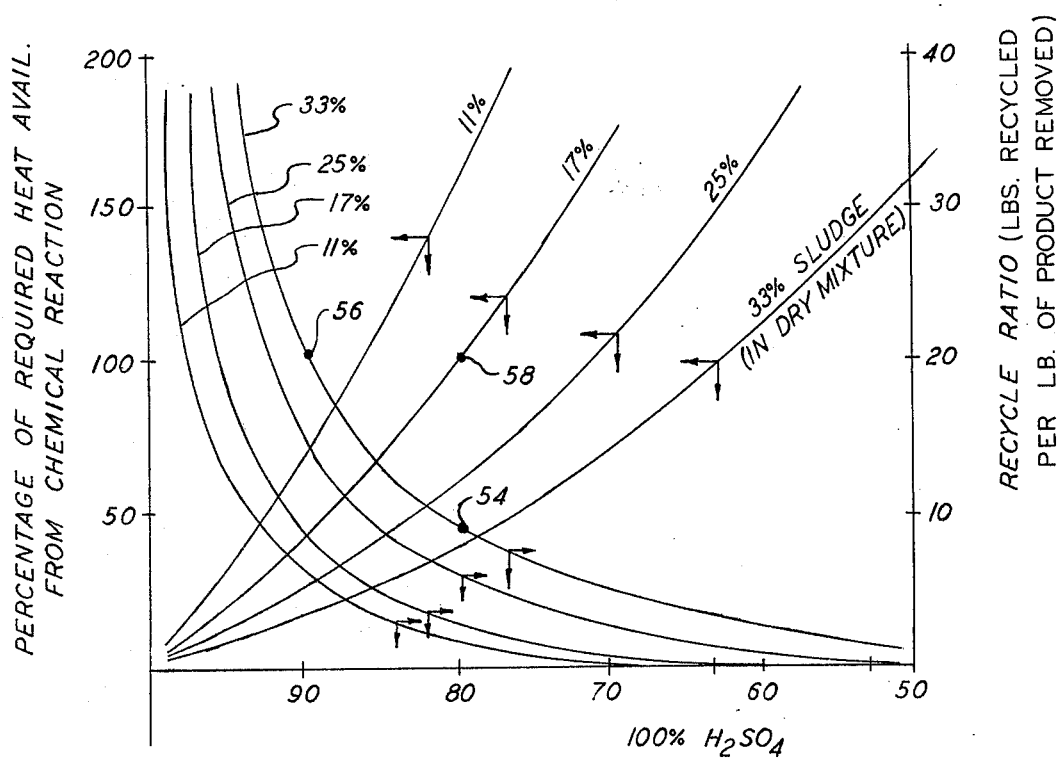

The curves shown in FIGS. 2 and 3 use the same horizontal scale, i.e., the initial water content of the sludge being processed in terms of the weight of the water as a percentage of the total weight of the sludge. The curves of FIGS. 2 and 3 apply to a process wherein the chemical mixed with the sludge in vessel 10 is sulphuric acid of 100% concentration prior to being mixed with the sludge. The four curves in FIG. 2 relate the initial water content of the sludge to the resultant concentration of the acid after dilution by the water in the sludge for a desired level of sludge solids in the final product. The vertical scale on the left side corresponds to the concentration of the diluted acid for the various levels of sludge solids as a percentage by weight of the final, dry product indicated by the four curves. For example, if the sludge is initially 80% water, point 50 on the lower curve indicates that if the end product is to be 33% sludge solids, the concentration of the acid after mixing with the sludge will be 26%. For the same initial water content, if the end product is to include 11% sludge solids, the acid concentration will be 60%, as shown by point 52 on the upper curve. The vertical scale on the right side is provided to show the boiling point of the acid at the concentration indicated at the same level on the left vertical scale. That is, the boiling point of sulphuric acid at 60% concentration is 284° F.

The four curves in FIG. 3 which lower, or decrease, from left to right correspond to the vertical scale on the right. These curves relate the initial water content of the sludge for a desired level of sludge solids in the final product to the recycle ratio, i.e., the percentage of the end product which is to be fed back to reaction vessel 28 in order to provide the desired process parameters such as temperature, moisture content, and plasticity. For example, for sludge having an initial water content of 80%, if the final product is to consist of 33% sludge solids, point 54 on the 33% parameter (upper curve) indicates that about 9 lbs. of the dried sludge/salt mixture per lb. of final product must be recycled to vessel 28. If the initial water content is 90%, then 20 lbs. of dried sludge/salt mixture per lb. of final product is recycled as indicated by point 56 on the same curve.

The four curves which rise or increase toward the right in FIG. 3 relate the initial water content of the sludge to the percentage of the total heat required for complete drying of the product formed in reaction vessel 28 which is available from the heat of the reaction itself for various levels of sludge solids in the final product. For example, point 58 on the curve corresponding to a sludge solids content of 17% indicates that approximately 100% of the required heat is provided by the reaction for sludge which is initially 80% water by weight. If the sludge solids content of the product is higher, a lower percentage of the required heat is available from the reaction in vessel 28.

Figure 4:
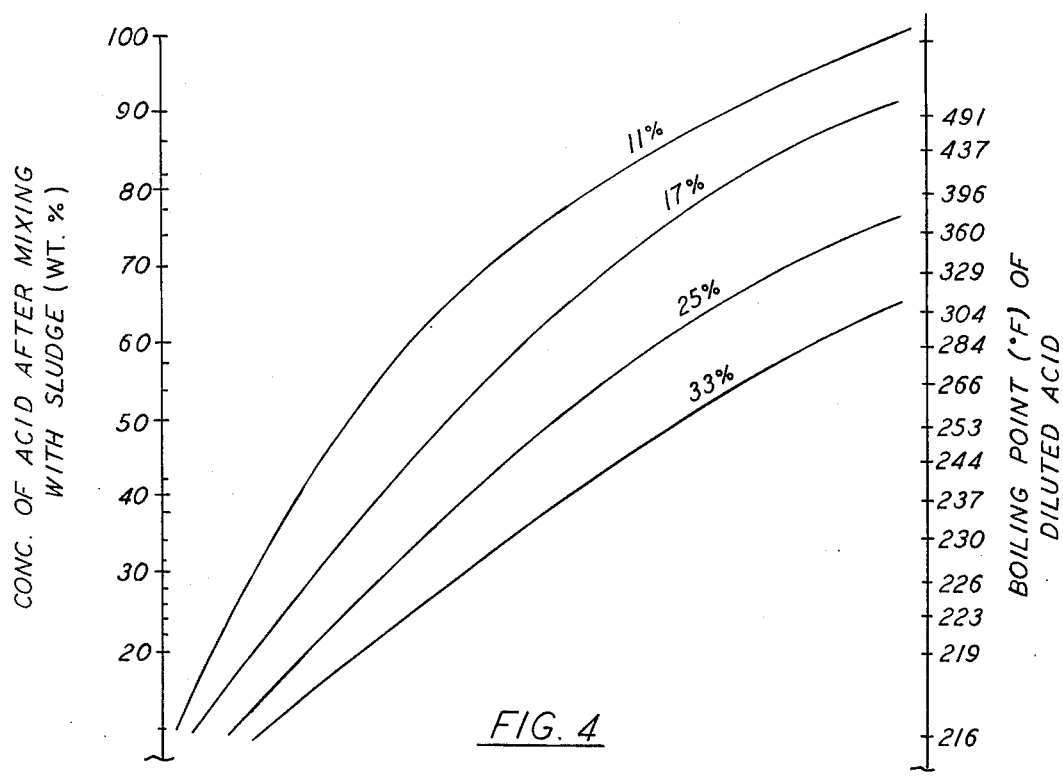
FIGS. 4 and 5 are a set of curves illustrating the same relationships when employing a sulfur trioxide and ammonia.
Figure 5:
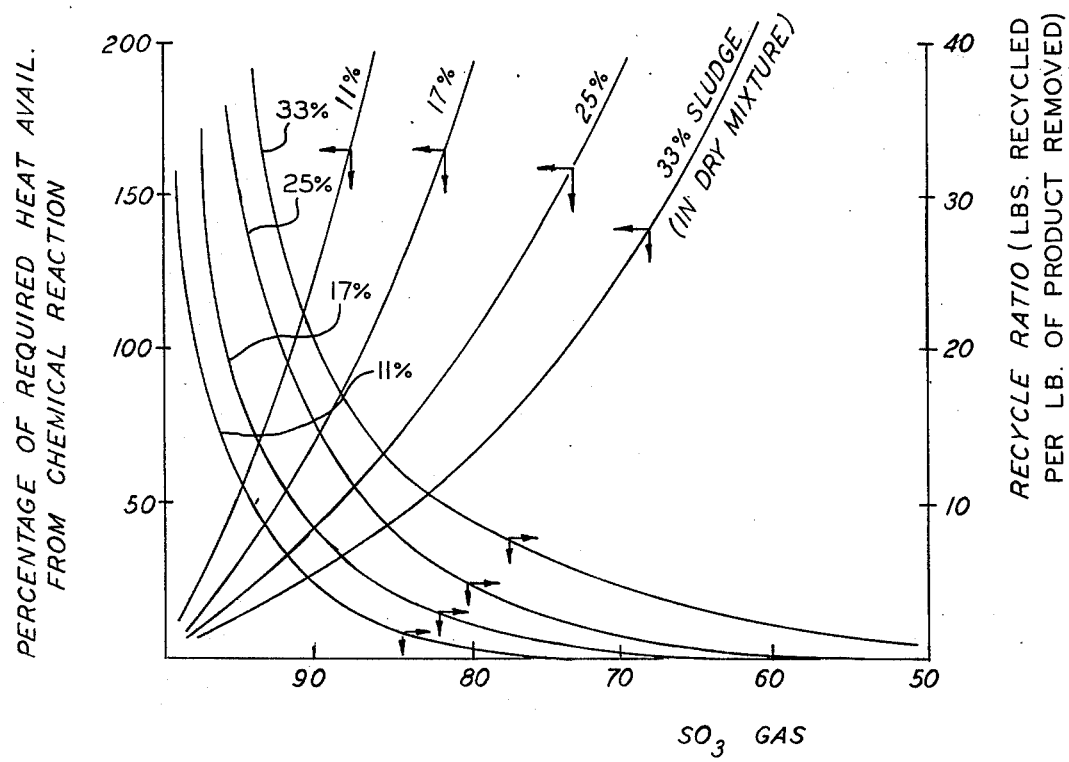

The curves of FIGS. 2 and 3 represent the various described relationships between process parameters when the chemical mixed with the sludge in mixing vessel 10 is sulfuric acid at an initial concentration of 100%. The curves of FIGS. 4 & 5 illustrate the same relationships when sulfur trioxide is the chemical mixed with the sludge in vessel 10. It should also be pointed out that the recycle ratios represented on the right side vertical scales of both FIGS. 3 & 5 are calculated on the assumption that the materials combined in reaction vessel 28 are 35% liquid phase and the temperature within vessel 28 is maintained at 275° F. The recycle ratio will vary if these parameters are changed. It is preferred that the temperature within vessel 28 be maintained at 250° F or higher in order to provide proper granulation.

In order to provide a fuller understanding of the invention, a pair of specific examples of actual practise of the method will now be given. In both examples the apparatus utilized is that of a typical fertilizer granulation plant and, since the process is to be carried on in a continuous manner, the pre-neutralizer of the plant is initially charged with a quantity of chemical such as the acid or anhydride to be mixed with the sludge at about the concentration it would have after dilution by the water in the sludge.

EXAMPLE I

A conventional agitated preneutralizer of a typical fertilizer granulation plant initially contains refluxing sulphuric acid of about 30–35% concentration at 225°–230° F. To this is added sulphur trioxide gas at a rate of 22.6 tons per hour and sewage sludge having a water content of 85% by weight at a rate of 83.3 tons per hour. The sulphur trioxide combines with some of the water initially contained in the sludge to form sulphuric acid, diluted by the remainder of the sludge water. The mixture from the preneutralizer is added to the fertilizer plant granulator simultaneously with ammonia at a rate of 9.7 tons per hour and recycled, dry material from the end product of the process at a rate sufficient to maintain the temperature of the material in the granulator at 250°–275° F, which will typically constitute about 85 to 90% of the final product. The hot, moist, granular material is then dried, using hot air generated in the process, and passed through a cooler. The chemical reaction within the granulator provides about 75% of the energy required to evaporate the remaining water at a rate of 65 tons per hour. The final product, obtained at a rate of about 50 tons per hour, is a granulated mixture of 75% ammonium sulfate and 25% sludge solids.

EXAMPLE II

Sewage sludge of 80% water content is added at 42.4 tons per hour and 100% concentrated sulphuric acid is added at 30.7 tons per hour to a preneutralizer containing sulphuric acid at about 50% concentration, refluxing at about 250° F. The acid/sludge mixture is added to the granulator together with 10.8 tons per hour of ammonia, and recycled dry material. Final product is obtained at a rate of 50 tons per hour, of which 83–86% is recycled through the granulator. The final product is 83% ammonium sulfate and 17% sludge solids. The chemical reaction provides all of the heat required to evaporate the 34 tons per hour of water generated in the process.

From the foregoing detailed description and examples, it is apparent that the process provides an effective and economical dewatering and disposal system for typical municipal and industrial sewage sludges. The process is carried out through conventional apparatus currently in commercial use, requiring little or no adaptations. The water is evaporated largely or fully by heat generated naturally in the course of the process, thus requiring little or no supplemental energy consumption. The process produces no harmful pollutants, or the like, the only significant exhaust gases being water vapor. In fact, besides disposing of and utilizing sewage sludges, the process may utilize other potentially harmful compounds such as sulfur trioxide. The final product consists of fertilizer salts and sludge solids having useful soil nutrient properties.

What is claimed is:

1. A process of dewatering noncompressible sewage sludge initially containing a known percentage by weight of water but no gaseous air phase to form an end product containing a predetermined percentage by weight of sludge solids, said process consisting essentially of:
    a. physically mixing a quantity of sewage sludge having a water content sufficient to render it non-compressible with a quantity of mineral acid or anhydride thereof sufficient to extract substantially all of the water initially contained in the sludge to form a mixture of sludge solids and water diluted acid; and
    b. placing in a reaction vessel said mixture and a base of a type and quantity sufficient to react with the acid or anhydride contained in said mixture to generate a reactive heat sufficient to remove by evaporation all of the water remaining in said mixture required to allow formation, without filtration, of a granular product comprising sludge solids and a salt.

2. The invention according to claim 1 wherein said acid or anhydride is selected from the group consisting of phosphoric acid, phosphorous acid, sulfuric acid, sulfurous acid, sulfur dioxide, and sulfur trioxide.

3. The invention according to claim 2 wherein said base is ammonia.

4. The invention according to claim 1 wherein said predetermined quantity of water evaporated constitutes substantially all of the water contained in said mixture.

5. The invention according to claim 1 wherein said predetermined quantity of water evaporated constitutes substantially less than all of the water contained in said mixture, and including the further step of air drying the product after reaction of said base with the acid or anhydride contained in said mixture.

6. The invention according to claim 1 wherein the temperature of the reacting mass generated by said reactive heat is at least 250° F.

7. The invention according to claim 1 and further including recycling a predetermined portion of said product by adding said portion to said reaction vessel simultaneously with said mixture and base.

8. The invention according to claim 7 wherein the relative proportions of said recycled portion of said product, said mixture and said base are balanced to maintain a temperature and moisture content of the mass within said reaction vessel yielding a desired consistency of said mass.

9. The invention according to claim 5 and including the further step of condensing in a heat exchanger at least a portion of any volatile substances which are boiled off by the heat generated by mixing the sludge and acid or anhydride.

10. The invention according to claim 9 and further including providing at least a portion of the heated air from said heat exchanger to perform said air drying step.

* * * * *